US012785262B2

(12) United States Patent
Yang

(10) Patent No.: US 12,785,262 B2
(45) Date of Patent: Nov. 3, 2026

(54) ELECTRONIC DEVICE

(71) Applicant: Lenovo (Beijing) Limited, Beijing (CN)

(72) Inventor: Shirong Yang, Beijing (CN)

(73) Assignee: LENOVO (BEIJING) LIMITED, Beijing (CN)

( * ) Notice: Subject to any disclaimer, the term of this patent is extended or adjusted under 35 U.S.C. 154(b) by 27 days.

(21) Appl. No.: 18/962,710

(22) Filed: Nov. 27, 2024

(65) Prior Publication Data

US 2025/0183528 A1 Jun. 5, 2025

(30) Foreign Application Priority Data

Nov. 30, 2023 (CN) ......................... 202311631108.6

(51) Int. Cl.
*H01Q 1/52* (2006.01)
*H01Q 1/22* (2006.01)
*H01Q 9/16* (2006.01)
*H01Q 9/30* (2006.01)

(52) U.S. Cl.
CPC ............... *H01Q 1/521* (2013.01); *H01Q 1/22* (2013.01); *H01Q 9/16* (2013.01); *H01Q 9/30* (2013.01)

(58) Field of Classification Search
CPC H01Q 1/521; H01Q 1/22; H01Q 9/16; H01Q 9/30; H01Q 5/335; H01Q 5/378; H01Q 7/00; H01Q 21/28; H01Q 1/243; H01Q 1/24; H01Q 1/38; H01Q 1/48; H01Q 1/50; H01Q 25/04
See application file for complete search history.

(56) References Cited

U.S. PATENT DOCUMENTS

2022/0223999 A1* 7/2022 Wu .......................... H01Q 9/42
2025/0392031 A1* 12/2025 Choi ........................ H01Q 1/22

FOREIGN PATENT DOCUMENTS

WO WO-2022242636 A1 * 11/2022 ............... H01Q 1/52
WO WO-2024046220 A1 * 3/2024 ............. H01Q 1/521

OTHER PUBLICATIONS

Translation_WO2022242636 (Year: 2022).*
Translation_WO2024046220 (Year: 2022).*

* cited by examiner

*Primary Examiner* — Renan Luque
(74) *Attorney, Agent, or Firm* — ANOVA LAW GROUP, PLLC

(57) ABSTRACT

An electronic device includes a first body including N antenna(s), and a second body capable of flipping relative to the first body and including M antenna(s). The N and M antennas are configured to form target antennas with multi-input-multi-output, capable of simultaneously being in a working state, and having a same communication frequency band. The target antennas include a first antenna from the N antenna(s) and a second antenna from the M antenna(s), and are configured such that, when the first and second bodies are in a non-stacked position relationship, the target antennas are in the working state, and a distance between the first and second antenna meets an isolation requirement, and when the first and second bodies are in a stacked position relationship, the target antennas are in the working state, and antenna forms of the first and second antennas meet the isolation requirement.

16 Claims, 14 Drawing Sheets

ELECTRONIC DEVICE

CROSS-REFERENCE TO RELATED APPLICATION

This application claims priority to Chinese Patent Application No. 202311631108.6, filed on Nov. 30, 2023, the entire content of which is incorporated herein by reference.

TECHNICAL FIELD

The present disclosure generally relates to the field of wireless communication technologies and, more particularly, to an electronic device with a wireless communication function.

BACKGROUND

With the continuous development of science and technology, more and more electronic devices with wireless communication functions are widely used in people's daily lives and work, which has brought great convenience to people's daily lives and work and has become an indispensable tool for people today.

A main component of an electronic device to realize the wireless communication functions is an antenna. To meet more wireless communication functions of the electronic device, multiple antennas are generally integrated in the electronic device. Isolation requirements between different antennas are achieved based on distance design.

Since the distance design is used to meet the isolation requirements between different antennas, for a foldable electronic device, when the two bodies of the electronic device are in a folded configuration with a stacked position relationship, the distance between the two bodies is small, resulting in the inability to set antennas with the same communication frequency band in the relative areas of the stacked position relationship. Therefore, the antennas with the same communication frequency band in the two bodies need to be staggered in the stacked position relationship, thereby increasing the space for antenna layout in the electronic device. For small electronic devices, because of the limitations in the internal space layout, the above problems will lead to the inability to integrate multiple antennas with the same frequency band in the electronic device.

SUMMARY

In accordance with the present disclosure, there is provided an electronic device including a first body including one or more antennas, and a second body configured to be capable of flipping relative to the first body and including one or more antennas. The one or more antennas of the first body and the one or more antennas of the second body are configured to at least form a plurality of target antennas with multiple inputs and multiple outputs. The plurality of target antennas are configured to be capable of simultaneously being in a working state and have a same communication frequency band. The plurality of target antennas include a first antenna that is one of the one or more antennas of the first body and a second antenna that is one of the one or more antennas of the second body. The plurality of target antennas are configured such that, when the first body and the second body are in a non-stacked position relationship, the plurality of target antennas are in the working state, and a distance between the first antenna and the second antenna meets an isolation requirement, and when the first body and the second body are in a stacked position relationship, the plurality of target antennas are in the working state, and an antenna form of the first antenna and an antenna form of the second antenna meet the isolation requirement.

DETAILED DESCRIPTION OF THE EMBODIMENTS

Figure 1:
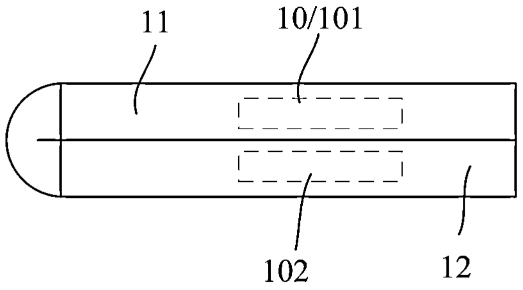
FIG. 1 is a side view of an electronic device when two bodies are in a stacked position relationship consistent with the present disclosure.

Specific embodiments of the present disclosure are hereinafter described with reference to the accompanying drawings. The described embodiments are merely examples of the present disclosure, which may be implemented in various ways. Specific structural and functional details described herein are not intended to limit, but merely serve as a basis for the claims and a representative basis for teaching one skilled in the art to variously employ the present disclosure in substantially any suitable detailed structure. Various modifications may be made to the embodiments of the present disclosure. Thus, the described embodiments should not be regarded as limiting, but are merely examples. Those skilled in the art will envision other modifications within the scope and spirit of the present disclosure.

It is obvious to those skilled in the art that various modifications and changes can be made in the present disclosure without departing from the spirit or scope of the present disclosure. Therefore, the present disclosure is intended to cover modifications and changes of the present disclosure that fall within the scope of the corresponding claims (technical solutions and claimed for protection) and their equivalents. It should be noted that the implementation methods provided in the embodiments of the present disclosure can be combined with each other without contradiction.

The present disclosure provides an electronic device. In one embodiment shown in FIG. 1, which is a side view of an electronic device when two bodies are in a stacked position, and FIG. 2 which is a side view of the electronic device when the two bodies are in a non-stacked position, the electronic device includes:

- a first body 11 including N antennas 10, where N is an integer larger than or equal to 1; and
- a second body 12 that is able to be flipped relative to the first body 11 and includes M antennas, where M is an integer greater than or equal to 1.

The N antennas and the M antennas may be able to at least form a plurality of target antennas with multiple inputs and multiple outputs, and the plurality of target antennas may be able to be in the working state at the same time with the same communication frequency band. The plurality of target antennas may include a first antenna 101 belonging to the N antennas and a second antenna 102 belonging to the M antennas.

When the first body 11 and the second body 12 are in a non-stacked position relationship, the plurality of target antennas may be in the working state, and the distance between the first antenna 101 and the second antenna 102 may meet the isolation requirement.

When the first body 11 and the second body 12 are in a stacked position relationship, the plurality of target antennas may be in the working state, and the antenna form of the first antenna 101 and the antenna form of the second antenna 102 may meet the isolation requirement.

The values of M and N may be set to any positive integers based on need, and the embodiments of the present disclosure do not limit the values of M and N. At least one antenna 10 in the first body 11 may serve as a target antenna, and at least one antenna 10 in the second body 12 may serve as a target antenna.

When the first body 11 and the second body 12 are in the stacked position relationship, as shown in FIG. 1, the first body 11 and the second body 12 may be stacked after bending relative to each other, and may be in a relatively parallel state or an approximately relatively parallel state. At this time, the angle between the first body 11 and the second body 12 may be 0° or approximately 0°. When the first body 11 and the second body 12 are in the non-stacked position relationship, the angle between the first body 11 and the second body 12 may be larger than 0° and less than 360°. At this time, the first body 11 and the second body 12 may be in a coplanar flattened state or an approximately coplanar flattened state as shown in FIG. 2, or may be in a bent state at other angles.

Figure 2:
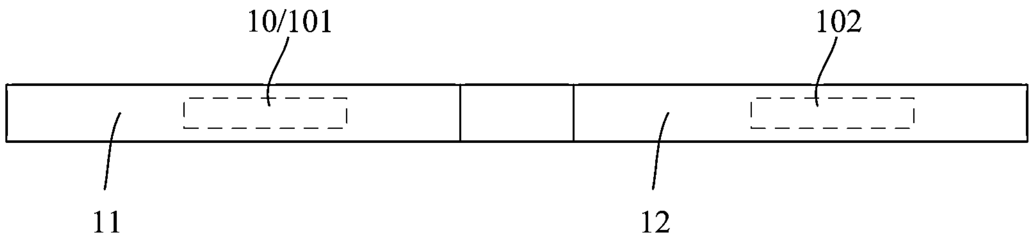
FIG. 2 is a side view of the electronic device when the two bodies are in a non-stacked position relationship consistent with the present disclosure.

As shown in FIG. 2, when the first body 11 and the second body 12 are in the non-stacked position relationship, there may be a large angle between the first body 11 and the second body 12, such that there is a large distance between the first antenna 101 in the first body 11 and the second antenna 102 in the second body 12, to make the distance between the first antenna 101 and the second antenna 102 meet the isolation requirement. Therefore, the mutual interference between the first antenna 101 and the second antenna 102 may be small, and there may not be mutual interference. In the present embodiment, in the stacked position relationship, the first antenna 101 and the second antenna 102 may be respectively set in the areas directly facing the first body 11 and the second body 12, without the need to isolate the two antennas based on distance in the stacked position relationship. Therefore, the antenna layout space may be saved, facilitating the design of multiple target antennas with multiple inputs and multiple outputs in the miniaturized electronic device.

As shown in FIG. 1, when the first body 11 and the second body 12 are in the stacked position relationship, although the angle between the first body 11 and the second body 12 is small such that the distance between the first antenna 101 in the first body 11 and the second antenna 102 in the second body 12 is small, the first antenna 101 and the second antenna 102 may have different antenna forms, such that the antenna form of the first antenna 101 and the antenna form of the second antenna 102 meet the isolation requirements, thereby reducing or even eliminating the mutual interference between the first antenna 101 and the second antenna 102 and ensuring the communication performance of the two antennas when the distance between the first antenna 101 and the second antenna 102 is small.

In the electronic device provided by the present disclosure, the plurality of target antennas may be in the working state at the same time and have the same communication frequency band, thereby forming a multi-input multi-output system, which may improve the reliability, transmission range and throughput of wireless communication. For the first antenna 101 and the second antenna 102, when the two bodies are in the non-stacked position relationship, because of the large distance between the two bodies, the distance between the first antenna 101 and the second antenna 102 may meet the isolation requirements. When the two bodies are in the stacked position relationship, based on the antenna form design of the two antennas, the antenna form of the first antenna 101 and the antenna form of the second antenna 102 may meet the isolation requirements.

In one embodiment, the first antenna 101 may be set to be a monopole antenna, and the second antenna 102 may be set to be a dipole antenna. The monopole antenna and the dipole antenna have different antenna forms, which may make the far-field radiation directions of the first antenna 101 and the second antenna 102 different, thereby reducing or even eliminating the mutual interference between the first antenna 101 and the second antenna 102.

Figure 3:
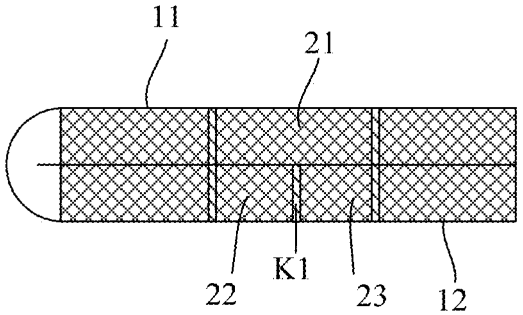
FIG. 3 is a side view of another electronic device when two bodies are in a stacked position relationship consistent with the present disclosure.
Figure 4:
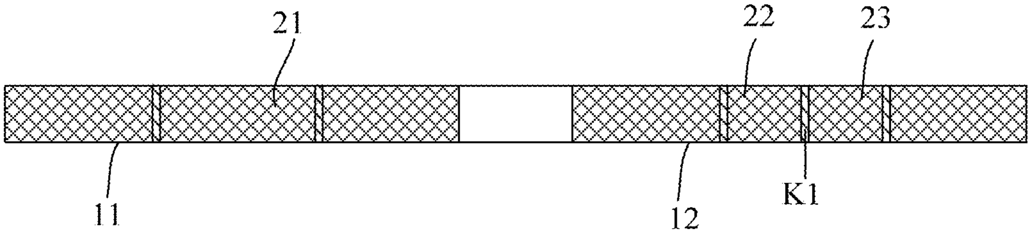
FIG. 4 is a side view of the other electronic device when the two bodies are in a non-stacked position relationship consistent with the present disclosure.

As shown in FIG. 3 which is a side view of another electronic device consistent with the present disclosure when two bodies are in the stacked position relationship and FIG. 4 which is a side view of the electronic device when two bodies are in the non-stacked position relationship, in one embodiment, the first antenna 101 may include a first metal segment 21 of a metal frame (hereinafter referred to as the first metal frame) of the first body 11; the second antenna 102 may include a second metal segment 22 and a third metal segment 23 of a metal frame (hereinafter referred to as the second metal frame) of the second body 12. When the first body 11 and the second body 12 are in the non-stacked position relationship, the first antenna 101 and the second antenna 102 may be located on the same side of the electronic device. When the first body 11 and the second body 12 are in the stacked position relationship, the second antenna 102 may be located in the orthogonal projection of the first antenna 101 on the second body 12.

Further, two gaps may be set on one same side of the first metal frame, and the first metal segment 21 may be disposed between the two gaps, such that the first metal segment 21 is separated from the first metal frame to serve as the first antenna 101. Three gaps may be set on one same side of the second metal frame. Two of the three gaps may separate the second metal segment 22 and the third metal segment 23 from the second metal frame, and the third metal gap may separate the second metal segment 22 from the third metal segment 23. Therefore, the first antenna 101 and the second antenna 102 may be formed based on the metal frame on the same side of the electronic device, without the need to prepare the first antenna 101 and the second antenna 102 with separate metal parts.

Based on the gaps, a first part of the first metal frame may be separated out as the first metal segment 21, and the second part of the second metal frame may be separated out as the second metal segment 22 and the third metal segment 23. When the first body 11 and the second body 12 are in the stacked position relationship, the second antenna 102 may be located in the orthogonal projection of the first antenna 101 on the second body 12. Therefore, the first part and the second part may vertically face each other in the stacked position relationship, the gaps at two ends of the first part may vertically face the gaps at two ends of the second part, and the gap layout may be regular and orderly. Also, the lengths of the first part and the second part may be made the same or approximately the same, which is convenient for designing the first antenna 101 and the second antenna 102 to have the same or similar communication frequency bands.

In one embodiment, the target radiation direction of the first antenna 101 may be set to satisfy an orthogonal relationship with the target radiation direction of the second antenna 102. The target radiation directions of the two antennas satisfying the orthogonal relationship may include that the target radiation directions of the two antennas are perpendicular or approximately perpendicular. The target radiation direction may be the far-field radiation direction of the antenna.

Figure 5:
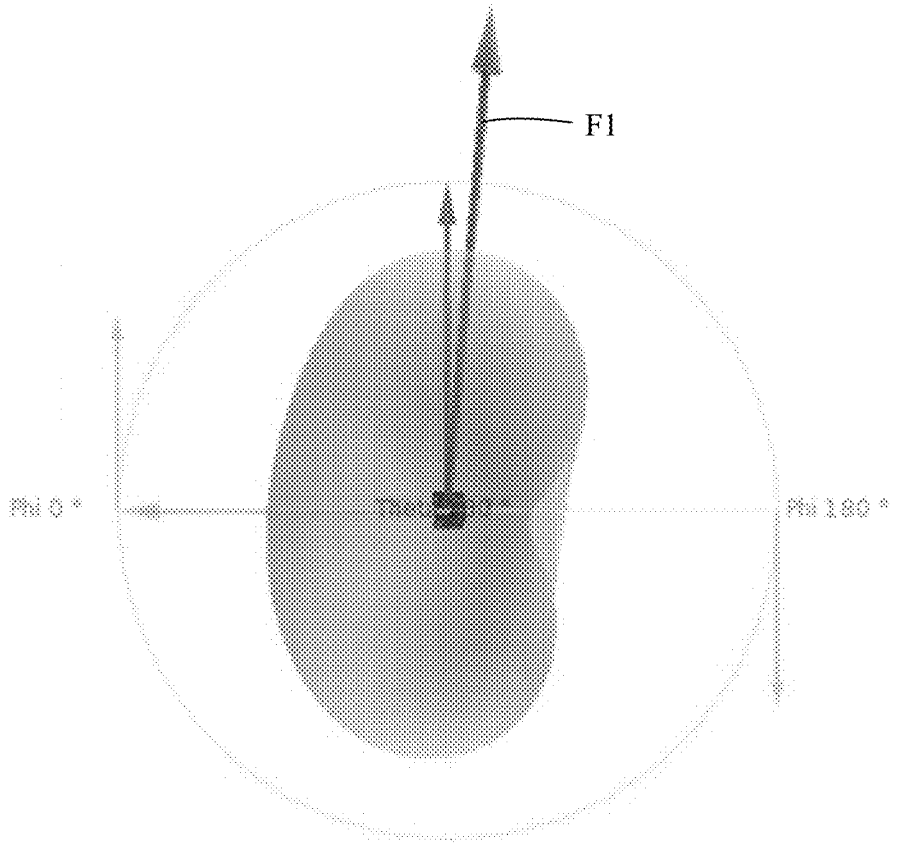
FIG. 5 is a schematic diagram showing a far-field radiation pattern of a first antenna consistent with the present disclosure.
Figure 6:
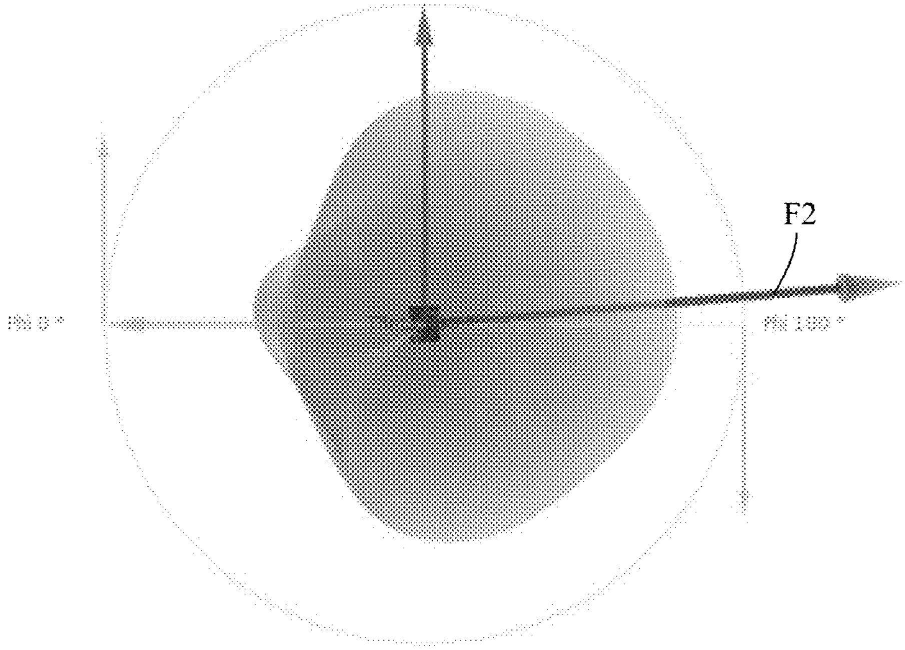
FIG. 6 is a schematic diagram showing a far-field radiation pattern of a second antenna consistent with the present disclosure.

As shown in FIG. 5, which shows the far-field radiation pattern of the first antenna and FIG. 6, which shows the far-field radiation pattern of the second antenna consistent with the present disclosure, in one embodiment, in the same azimuth plane Phi, FIG. 5 and FIG. 6 both show azimuth angles of 0° and 180°, and in the same elevation plane Theta, FIG. 5 and FIG. 6 both show an elevation angle of 180°. As shown in FIG. 5, the far-field radiation direction of the first antenna 101 may be F1, and as shown in FIG. 6, the far-field radiation direction of the second antenna 102 may be F2. The far-field radiation direction F1 of 101 may be orthogonal to the far-field radiation direction F2 of the second antenna 102, such that the mutual influence of the two antennas is small and the two antennas have good antenna radiation performance.

In one embodiment, a part of the metal frame in the first body 11 may be reused as the first antenna 101, and a part of the metal frame in the second body 12 may be reused as the second antenna 102. For example, the first antenna may include the first metal segment 21 of the metal frame of the first body 11, and the second antenna 102 may include the second metal segment 22 and the third metal segment 23 of the metal frame of the second body 12. The current flow direction in the first antenna 101 and the second antenna 102 may be set to meet the manner shown in FIG. 6 and FIG. 7.

Figure 7:
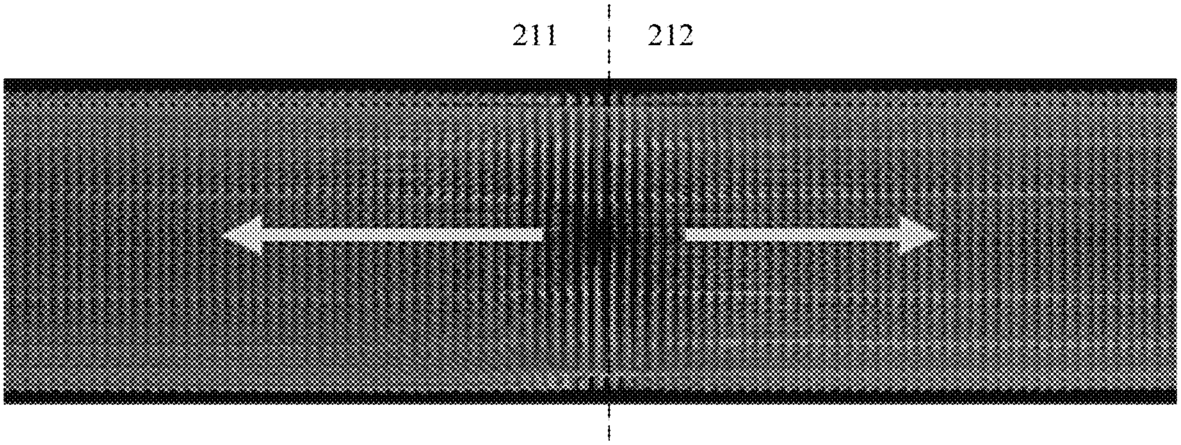
FIG. 7 is a schematic diagram showing a current distribution of a first antenna consistent with the present disclosure.
Figure 8:
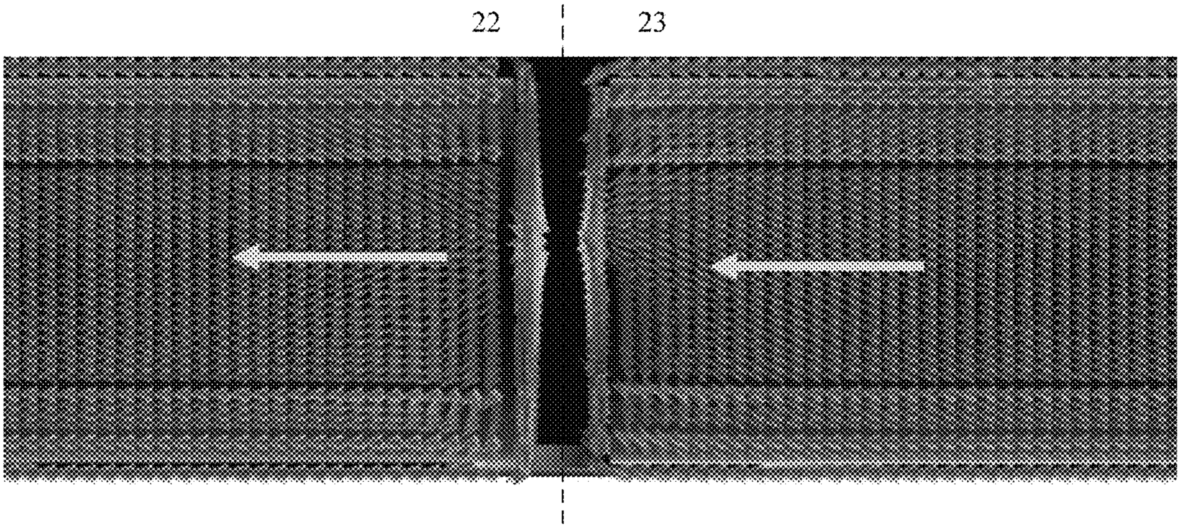
FIG. 8 is a schematic diagram showing a current distribution of a second antenna consistent with the present disclosure.
Figure 9:
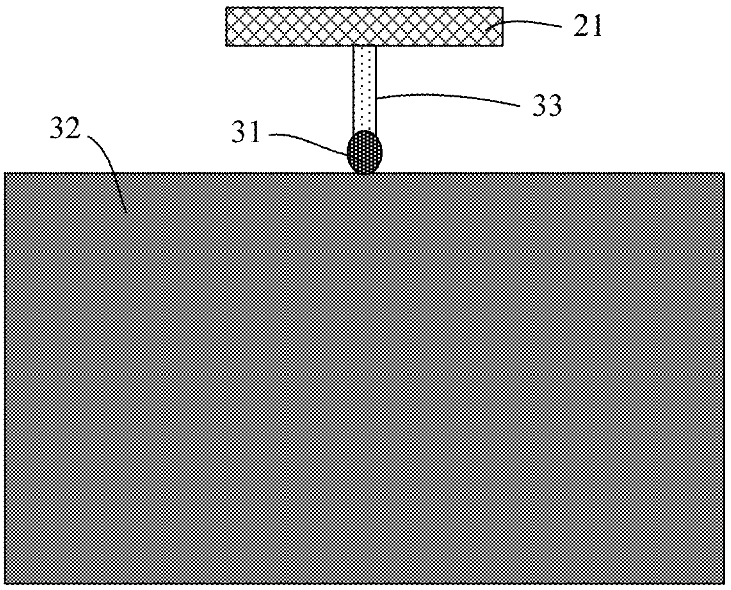
FIG. 9 is a schematic diagram showing a design principle of a first antenna of an electronic device consistent with the present disclosure.

As shown in FIG. 1 to FIG. 4, FIG. 7, which is a current distribution diagram in the first antenna provided by one embodiment of the present disclosure, and FIG. 8, which is a current distribution diagram in the second antenna provided by one embodiment of the present disclosure, the first metal segment 21 may include a first part 211 and a second part 212, and the current flow directions in the first portion 211 and the second portion 212 may be opposite, and the current flow direction of the second metal segment 22 may be the same as the current flow direction of the third metal segment 23. In FIG. 7 and FIG. 8, based on the current distribution in the metal segment, the current flow directions are shown by arrows. When the antenna is in the state of receiving signals and in the state of radiating signals, the current distribution may be different and the internal current may flow in different directions. Therefore, the current flows in the first part 211 and the second part 212 in FIG. 7 may also point from the two ends of the first metal segment 21 to the middle position of the first metal segment 21; and the current flows in the second metal segment 22 and the third metal segment 23 in FIG. 8 may also be from left to right.

The embodiment shown in FIG. 7 where the first part 211 and the second part 212 of the first metal segment 21 are an integral structure is used as an example for illustration. In subsequent embodiments, when there is a gap between the first part 211 and the second part 212 of the first metal segment 21, that is, the first part 211 and the second part 212 are two separate parts, the current distribution in the first part 211 and the second part 212 may also satisfy the above scheme.

Since the current flows in the first part 211 and the second part 212 of the first metal segment 21 are in opposite directions, the first antenna 101 may be equivalent to a monopole antenna. Since the current flow direction of the second metal segment 22 is the same as the current flow direction of the third metal segment 23, the second antenna 102 may be equivalent to a dipole antenna. Therefore, the first antenna 101 and the second antenna 102 may have different antenna forms, such that the isolation requirement may also be met when the distance between the first antenna and the second antenna is relatively short.

In the electronic device provided by the embodiment of the present disclosure, the target radiation direction of the first antenna 101 may be set to satisfy an orthogonal relationship with the target radiation direction of the second antenna 102; and/or, the current flows in the first part 211 and the second part 212 may be opposite, and the current flow direction of the second metal segment 22 may be the same as the current flow direction of the third metal segment 23.

When the second antenna 102 includes the second metal segment 22 and the third metal segment 23, the second metal segment 22 and the third metal segment 23 may be set symmetrically with respect to the first gap K1 between the second metal segment 22 and the third metal segment 23. In other words, there may be the first gap K1 between the second metal segment 22 and the third metal segment 23, and the second metal segment 22 and the third metal segment 23 may be axially symmetrical based on the first gap K1, such that the second antenna 102 may have two metal segments of the same length to form a dipole antenna.

Figure 10:
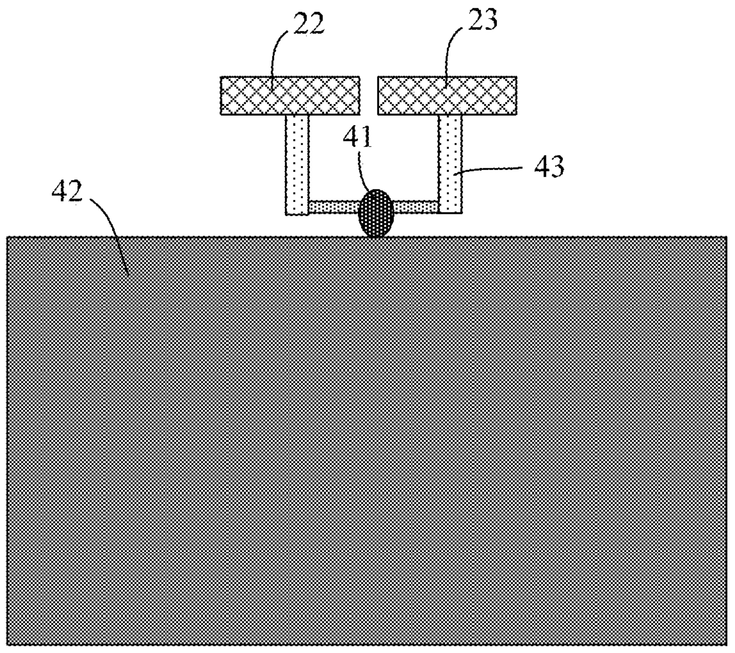
FIG. 10 is a schematic diagram showing a design principle of a second antenna of an electronic device consistent with the present disclosure.

As shown in FIG. 1 to FIG. 4, FIG. 9, which is a schematic diagram showing the design principle of the first antenna in the electronic device consistent with the present disclosure, and FIG. 10, which is a schematic diagram showing the design principle of the second antenna in the electronic device consistent with the present disclosure, the first body 11 may include: a first circuit board; a first feeding point 31 used to input signals to the first antenna 101; a first connector 33 which is connected to the first feeding point 31 and the first metal segment 21. The connection point between the first connector 33 and the first metal segment 21 may be located at the center of the first metal segment 21. A first part 211 and a second part 212 connected integrally may be located on two sides of the center of the first metal segment 21. The first feeding point 31 may be connected to a metal ground 32 of the first circuit board based on a first RF circuit. The first RF circuit may input signals to the first antenna 101 through the first feeding point. The first RF circuit is not shown in FIG. 9, and the first RF circuit may include an RF control chip.

The first body 11 may include a first feed line which is a coaxial cable having a core and a grounding layer surrounding the core. The grounding layer may be insulated from the core. The core of the first feed line may include a first feeding point 31. The core of the first feed line may be connected to the first metal segment 21 through the first connector 33, and the grounding layer of the first feed line may be connected to the metal ground 32 of the first circuit board. The core and the grounding layer of the first feed line may both be connected to the first radio frequency circuit. Therefore, the first metal segment 21 may be connected to the same potential at the center position, such that the current flow directions in the first part 211 and the second part 212 are both from the center position to the end, or both from the end to the center position, to make the first antenna 101 act as a monopole antenna.

As shown in FIG. 1 to FIG. 4, FIG. 9, and FIG. 10, the second body 12 may include: a second circuit board; a second feeding point 41 used to input a signal to the second antenna 102; a second connector 43. The second metal segment 22 may be connected to the second feeding point 42 through the second connector 43, and the third metal segment 23 may be connected to the metal ground 42 of the second circuit board through another second connecting line 43. The second feeding point 41 may be connected to the metal ground 42 of the second circuit board based on a second RF circuit. The second RF circuit is not shown in FIG. 10, and the second RF circuit may include an RF control chip.

The second body 12 may include a second feed line. The second feed line may be a coaxial cable having a core and a grounding layer surrounding the core. The grounding layer may be insulated from the core. The core of the second feed line may include a second feeding point 41. The core of the second feed line may be connected to the second metal segment 22 through the second connector 43, and the grounding layer of the second feed line may be connected to the third metal segment 23 through another second connector 43. The core and the grounding layer of the second feed line may be both connected to the second radio frequency circuit. Therefore, the second metal segment 22 and the third metal segment may be connected to high and low potentials respectively. When the core is a positive potential, in the radio frequency loop where the second antenna 102 is located, the second metal segment 22 may be equivalent to connecting the positive pole of the power supply, and the third metal segment 23 may be equivalent to connecting the negative pole of the power supply, such that the current in the second metal segment 22 flows from one end close to the first gap K1 to the other end, and the current in the third metal segment 23 flows from the end away from the first gap K1 to the end close to the first gap K1. When the core is at a negative potential, in the RF loop where the second antenna 102 is located, the second metal segment 22 may be equivalent to being connected to the negative pole of the power supply, and the third metal segment 23 may be equivalent to being connected to the positive pole of the power supply, such that the current in the third metal segment 23 flows from one end close to the first slot K1 to the other end, and the current in the second metal segment 22 flows from the end away from the first slot K1 to the end close to the first slot K1. This method may make the current flow directions of the second metal segment 22 and the third metal segment 23 the same, such that the second antenna 102 acts as a dipole antenna.

Figure 11:
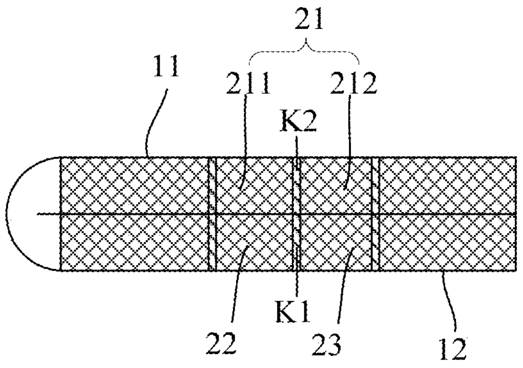
FIG. 11 is a side view of another electronic device when two bodies are in a stacked position relationship consistent with the present disclosure.
Figure 12:
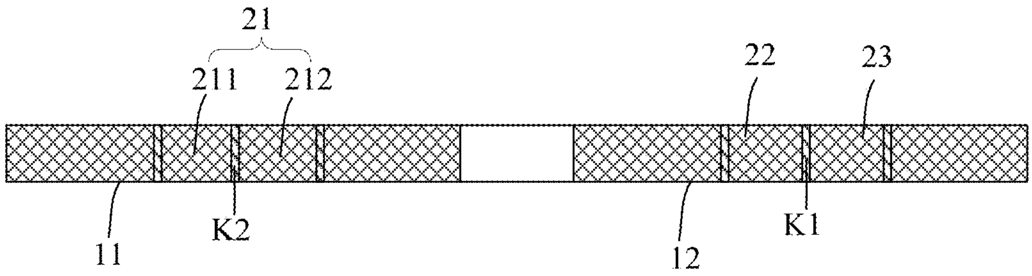
FIG. 12 is a side view of the other electronic device when the two bodies are in a non-stacked position relationship consistent with the present disclosure.

As shown in FIG. 1, FIG. 2, FIG. 11, which is a side view of another electronic device when two bodies are in a stacked position relationship, and FIG. 12, which is a side view of another electronic device when two bodies are in a non-stacked position relationship, a second gap K2 may be provided between the first part 211 and the second part 212 of the first metal segment 21, and the first part 211 and the second part 212 may be symmetrically arranged based on the second gap.

Figure 13:
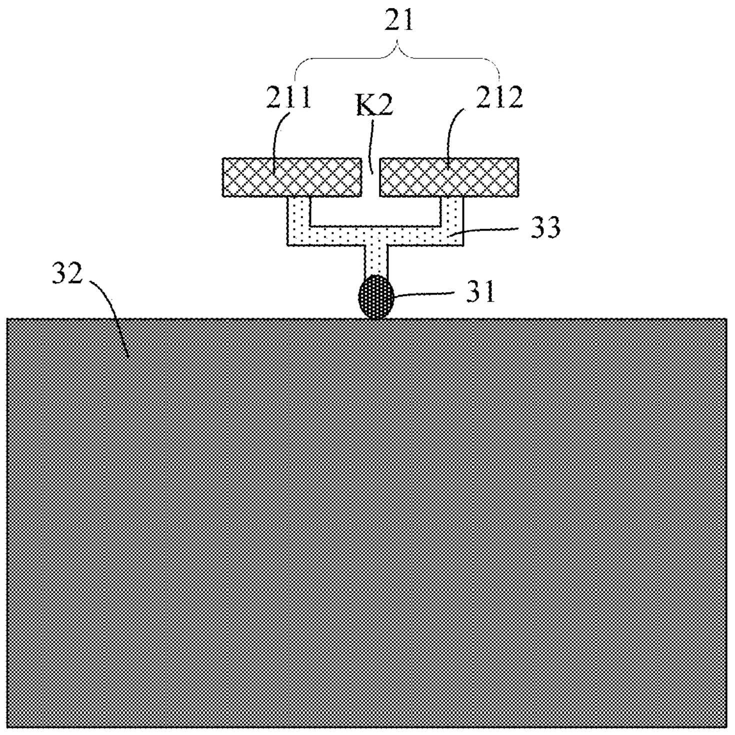
FIG. 13 is a schematic diagram showing a design principle of a first antenna of another electronic device consistent with the present disclosure.

When the first part 211 and the second part 212 of the first metal segment 21 are separated based on the second gap K2, the design principle of the first antenna is shown in FIG. 13.

As shown in FIG. 1, FIG. 2, FIG. 11, FIG. 12, and FIG. 13, which is a schematic diagram showing the design principle of the first antenna in an electronic device, the first body may include: a first circuit board; a first feeding point 31 used to input a signal to the first antenna 101; and a first connector 33. One end of the first connector 33 may be connected to the first feeding point 31, and the other end of the first connector 33 may be connected to the first part 211 and the second part 212. The first feeding point 31 may be connected to the metal ground 32 of the first circuit board based on the first radio frequency circuit.

As shown in FIG. 13, the first body 11 may include a first feed line, and the first feed line may be a coaxial cable having a core and a grounding layer surrounding the core. The grounding layer may be insulated from the core. The core of the first feed line may include a first feeding point 31. The core of the first feed line may be connected to the first part 211 and the second part 212 of the first metal segment 21 through the first connector 33, and the grounding layer of the first feed line may be connected to the metal ground 32 of the first circuit board. The core and the grounding layer of the first feed line may be both connected to the first radio frequency circuit. Therefore, the first metal segment 21 may be connected to the same potential at the center position, such that the current in the first part 211 and the second part 212 flows from the center position to the end, or from the end to the center position, and the first antenna 101 acts as a monopole antenna.

As shown in FIG. 13, the second body 12 may include: a second circuit board; a second feeding point 41 used to input signals to the second antenna 102; and a second connector 43. The second metal segment 22 may be connected to the second feeding point 42 through a second connector 43, and the third metal segment 23 may be connected to the metal ground 42 of the second circuit board through another second connecting line 43. The second feeding point 41 may be connected to the metal ground 42 of the second circuit board based on the second RF circuit.

When the first part 211 and the second part 212 are an integrated structure, the length of the first metal segment 21 may be equal to the sum of the length of the second metal segment 22, the length of the third metal segment 23 and the width of the gap between the second metal segment 22 and the third metal segment 23. Assuming the length of the first metal segment 21 is L21, the length of the second metal segment 22 is L22, and the length of the third metal segment 23 is L23, the width of the first gap is LK1, L21, L22, L23 and LK1 may satisfy the following relationship $$L21 = L22 + L23 + LK1. \tag{1}$$

When the first part 211 and the second part 212 are an integrated structure, the above formula (1) may be satisfied, such that the first antenna 101 and the second antenna 102 are set to have the same or similar communication frequency band.

In another embodiment, when there is a gap between the first part 211 and the second part 212, the sum of the length of the first part 211, the length of the second part 212, and the width of the gap between the first part 211 and the second part 212 may be equal to the sum of the length of the second metal segment 22, the length of the third metal segment 23, and the width of the gap between the second metal segment 22 and the third metal segment 23. Assuming the length of the first part 211 to be L211, the length of the second part 212 to be L212, the width of the second gap K2 to be LK2, the length of the second metal segment 22 to be L22, the length of the third metal segment 23 to be L23, the width of the first gap K1 to be LK1, L211, L212, LK2, L22, L23, and LK1 may satisfy the following relationship:

$$L211 + L212 + L\ \ K2 = L22 + L23 + LK1. \tag{2}$$

When there is a gap between the first part 211 and the second part 212, the setting may satisfy the above formula (2), to facilitate setting the first antenna 101 and the second antenna 102 to have the same or similar communication frequency band.

Figure 14:
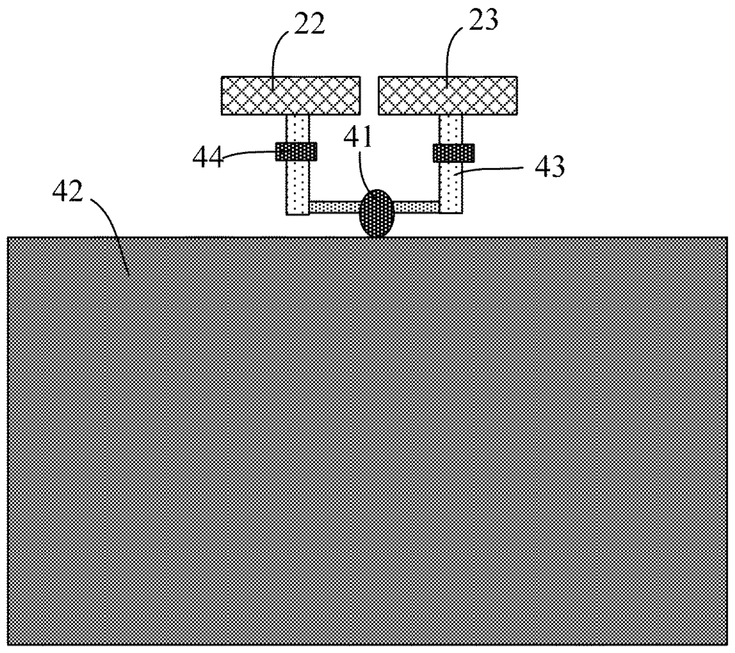
FIG. 14 is a schematic diagram showing a design principle of a second antenna of another electronic device consistent with the present disclosure.

As shown in FIG. 14 which is a schematic diagram showing the design principle of the second antenna in another electronic device consistent with the present disclosure, in one embodiment, the second body 12 may also include matching circuits 44, which are used to adjust the current intensity in the second metal segment 22 and/or to adjust the current intensity in the third metal segment 23, to improve the balance of the current intensity of the second metal segment 22 and the third metal segment 23 and ensure the performance of the second antenna 102.

In the embodiment shown in FIG. 14, the second connector 43 connected to the second metal segment 22 and the second connector 43 connected to the third metal segment 23 may both be provided with matching circuits. In other embodiments, one of the second connector 43 connected to the second metal segment 22 and the second connector 43 connected to the third metal segment 23 may be provided with a matching circuit. The matching circuit located in one second connector 43 may include an inductor and a capacitor connected in series.

Figure 15:
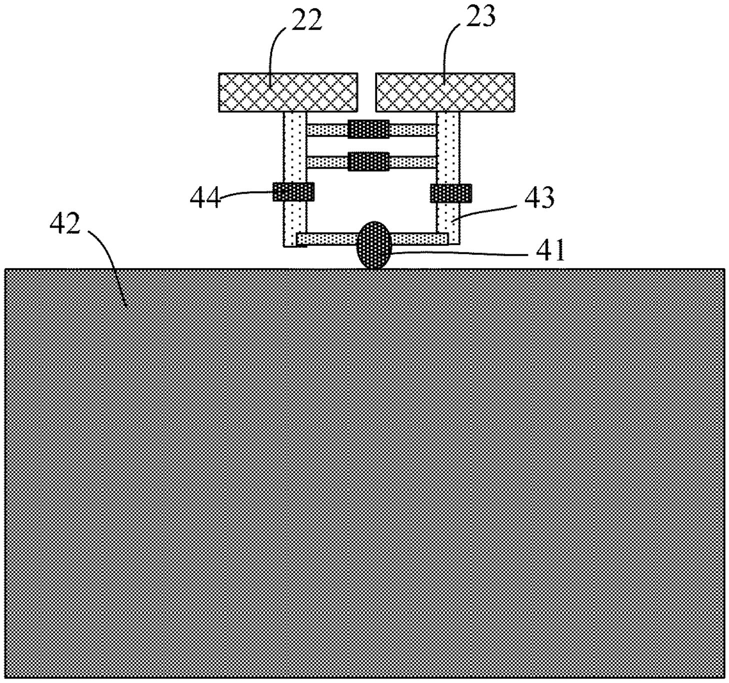
FIG. 15 is a schematic diagram showing a design principle of a second antenna of another electronic device consistent with the present disclosure.

As shown in FIG. 15 which is a schematic diagram showing the design principle of the second antenna in another electronic device consistent with the present disclosure, in another embodiment, at least a matching circuit 44 may be connected between the second connector 43 connected to the second metal segment 22 and the second connector 43 connected to the third metal segment 23, which is used to adjust the current intensity in the second metal segment 22 and the third metal segment 23 such that the current intensity in the second metal segment 22 and the third metal segment 23 is balanced.

In the present disclosure, it may be set based on the need that the second connector 43 has a matching circuit 44 and/or that the matching circuit 44 is connected between the two second connectors 43. In some embodiments, multiple matching circuits 44 may be connected between the two second connectors 43, and the multiple matching circuits 44 may be connected in parallel. The matching circuit 44 connected between the two second connectors 43 may include a capacitor and an inductor connected in parallel.

By setting the matching circuit 44 connected to the second antenna 102 in the second body 12, the current intensity in the second metal segment 22 and/or the current intensity in the third metal segment 23 may be adjusted, which not only improves the current intensity balance between the second metal segment 22 and the third metal segment 23, but also enables the first antenna 101 and the second antenna 102 to have a more consistent operating frequency, improving the working performance of the multiple-input multiple-output system.

Figure 16:
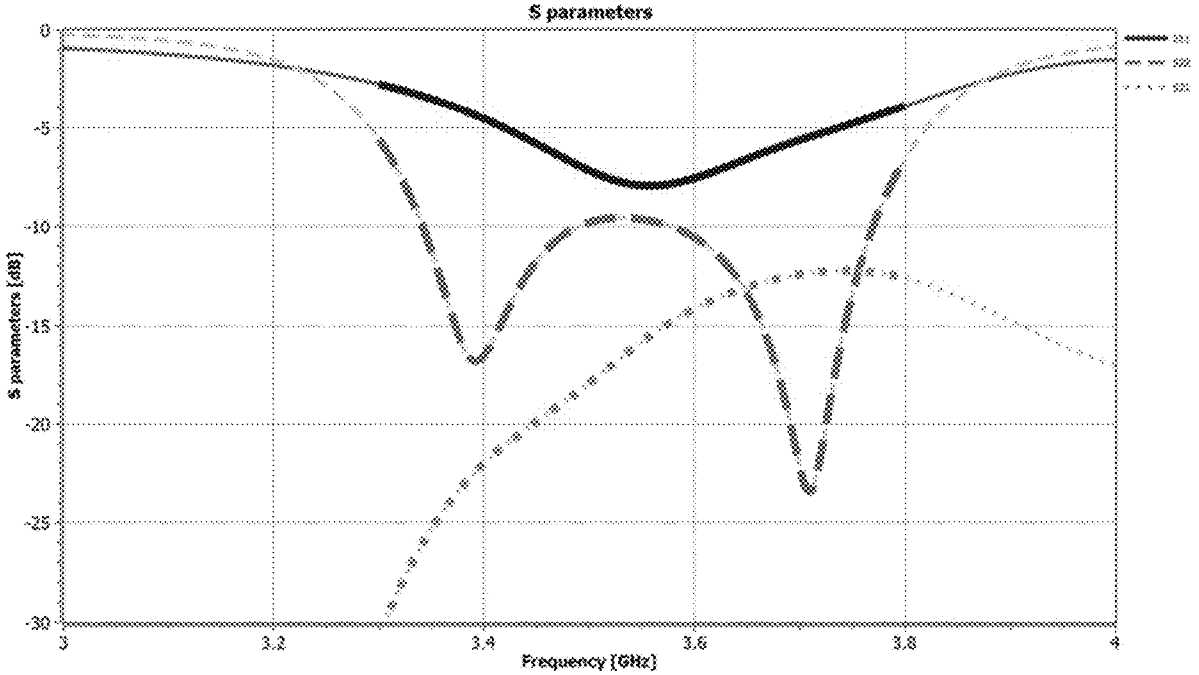
FIG. 16 is a schematic diagram showing an S parameter of an antenna of an electronic device consistent with the present disclosure.

As shown in FIG. 16, which is an S parameter curve of an antenna in an electronic device consistent with the present disclosure, FIG. 16 shows the S parameter curves of the first antenna 101 and the second antenna 102 in a stacked position relationship. S11 is the reflection coefficient curve of the antenna, S21 is the isolation curve of the first antenna 101 and the second antenna 102, and S22 is the scattering coefficient curve of the second antenna 102. Based on FIG. 16, it may be seen that the isolation of the first antenna 101 and the second antenna 102 in the 3.3 GHz~3.8 GHz frequency band is less than −9 dB, and has good isolation.

Figure 17:
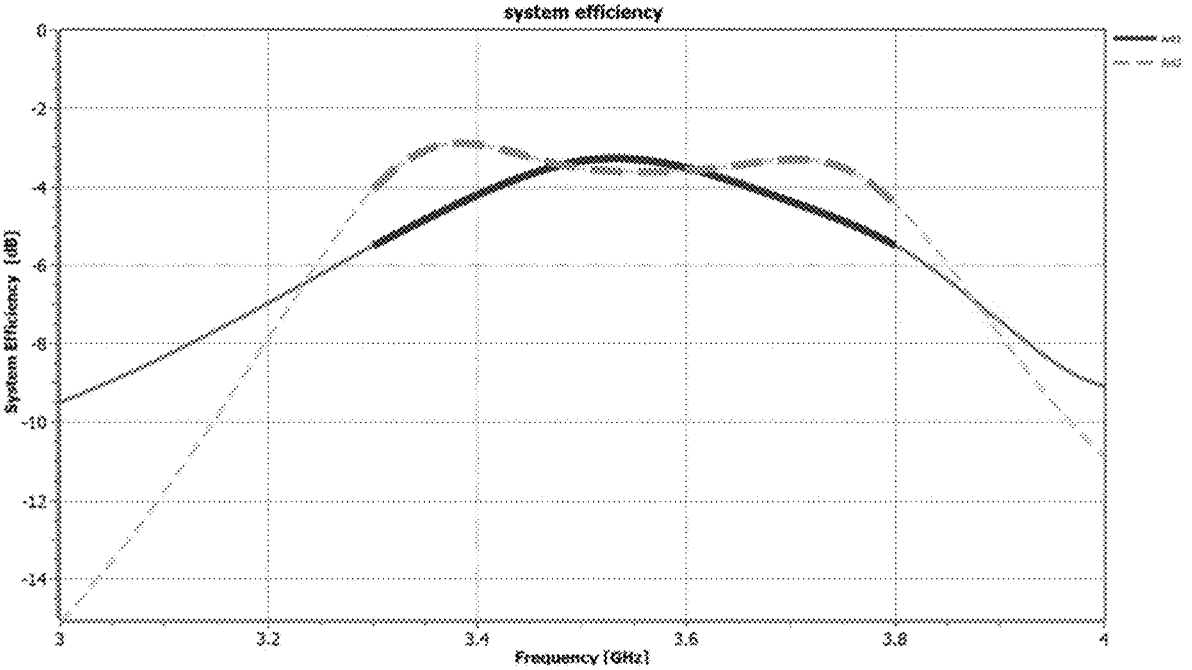
FIG. 17 is a schematic diagram showing a phase ratio curve of an antenna system of an electronic device consistent with the present disclosure.

As shown in FIG. 17 which is an antenna system phase rate curve in an electronic device consistent with the present disclosure, the dotted curve represents the system efficiency of the second antenna 102 in the stacked position relationship, and the solid curve represents the system efficiency of the first antenna 101 in the stacked position relationship. As shown in FIG. 17, it may be seen that the system efficiency of the first antenna 101 and the second antenna 102 in the 3.3 GHz~3.8 GHz frequency band is greater than −8 dB, and the system efficiency of the two meets the communication requirements in the stacked position relationship.

In conventional foldable electronic devices, when the two bodies are in a stacked position relationship, the antennas in the two bodies may not meet the isolation requirements because of the small distance between the two bodies, resulting in a sharp deterioration in the performance of the antennas in the two bodies. The first antenna 101 and the second antenna 102 provided by the present disclosure may improve the isolation of the first antenna 101 and the second antenna 102 in the stacked position relationship by different designs of the antenna forms of the first antenna 101 and the second antenna 102 when the two bodies are in a stacked position relationship, thereby ensuring that the radiation performance of the two meets the communication requirements.

In the present disclosure, each embodiment is described in a progressive, parallel, or progressive and parallel manner. Each embodiment focuses on the differences from other embodiments, and the same and similar parts between the embodiments can be referred to each other.

It should be noted that in the description of the present disclosure, it should be understood that the description of the drawings and embodiments is illustrative rather than restrictive. The same figure marks throughout the embodiments identify the same structure. In addition, for the purpose of understanding and ease of description, the drawings may exaggerate the thickness of some layers, films, panels, regions, etc. It can also be understood that when an element such as a layer, film, region or substrate is referred to as "on" another element, the element may be directly on the other element or there may be an intermediate element. In addition, "on . . . " refers to positioning an element on another element or below another element, but does not essentially refer to positioning on the upper side of another element according to the direction of gravity.

The orientation or positional relationship indicated by the terms "upper," "lower," "top," "bottom," "inside," "outside," etc. is based on the orientation or positional relationship shown in the drawings, and is only for the convenience of describing the present disclosure and simplifying the description, rather than indicating or implying that the device or element referred to must have a specific orientation, be constructed and operated in a specific orientation, and therefore cannot be understood as a limitation on the present disclosure. When a component is considered to be "connected" to another component, it may be directly connected to another component or there may be an intermediately arranged component at the same time.

It should also be noted that, in the present disclosure, relational terms such as first and second, etc. are only used to distinguish one entity or operation from another entity or operation, and do not necessarily require or imply that there is any such actual relationship or order between these entities or operations. It should also be noted that in the present disclosure, the terms "include," "comprise" or any other variant thereof are intended to cover non-exclusive inclusion, such that a process, method, article or device including a series of elements includes not only those elements, but also other elements not explicitly listed, or also includes elements inherent to such process, method, article or device. In the absence of further restrictions, an element defined by the sentence "includes one . . . " does not exclude the presence of other identical elements in the process, method, article or device including the element.

Various embodiments have been described to illustrate the operation principles and exemplary implementations. It should be understood by those skilled in the art that the present disclosure is not limited to the specific embodiments described herein and that various other obvious changes, rearrangements, and substitutions will occur to those skilled in the art without departing from the scope of the present disclosure. Thus, while the present disclosure has been described in detail with reference to the above described embodiments, the present disclosure is not limited to the above described embodiments, but may be embodied in other equivalent forms without departing from the scope of the present disclosure.

What is claimed is:

1. An electronic device comprising:

a first body including one or more antennas; and a second body configured to be capable of flipping relative to the first body, and including one or more antennas;

wherein:

the one or more antennas of the first body and the one or more antennas of the second body are configured to at least form a plurality of target antennas with multiple inputs and multiple outputs, and the plurality of target antennas are configured to be capable of simultaneously being in a working state and have a same communication frequency band;

the plurality of target antennas include a first antenna that is one of the one or more antennas of the first body and a second antenna that is one of the one or more antennas of the second body; and the plurality of target antennas are configured such that:

when the first body and the second body are in a non-stacked position relationship, the plurality of target antennas are in the working state, and a distance between the first antenna and the second antenna meets an isolation requirement;

when the first body and the second body are in a stacked position relationship, the plurality of target antennas are in the working state, and an antenna form of the first antenna and an antenna form of the second antenna meet the isolation requirement;

the first antenna includes two parts having opposite current flow directions; and the second antenna includes two metal segments separated by a gap and having a same current flow direction.

2. The electronic device according to claim 1, wherein the first antenna includes a monopole antenna, and the second antenna includes a dipole antenna.

3. The electronic device according to claim 1, wherein:

the two parts of the first antenna are a first part and a second part of a first metal segment of a metal frame of the first body; and the two metal segments of the second antenna are a second metal segment and a third metal segment of a metal frame of the second body.

4. The electronic device according to claim 1, wherein the first antenna and the second antenna are configured such that:

when the first body and the second body are in the non-stacked position relationship, the first antenna and the second antenna are located on a same side of the electronic device; and when the first body and the second body are in the stacked position relationship, the second antenna is located within a projection of the first antenna on the second body.

5. The electronic device according to claim 1, wherein a target radiation direction of the first antenna and a target radiation direction of the second antenna satisfy an orthogonal relationship.

6. The electronic device according to claim 1, wherein:

the two parts of the first antenna are a first part and a second part of a first metal segment of a metal frame of the first body; and the two metal segments of the second antenna are a second metal segment and a third metal segment of a metal frame of the second body.

7. The electronic device according to claim 1, wherein the two metal segments of the second antenna are symmetrically arranged with respect to the gap.

8. The electronic device according to claim 6, wherein:
the first part and the second part are an integral structure; and
a length of the first metal segment is equal to a sum of a length of the second metal segment, a length of the third metal segment, and a width of the gap.

9. The electronic device according to claim 6, wherein:
the gap is a first gap;
a second gap exists between the first part and the second part; and
a sum of a length of the first part, a length of the second part, and a width of the second gap is equal to a sum of a length of the second metal segment, a length of the third metal segment, and a width of the first gap.

10. The electronic device according to claim 1, wherein:
the two parts of the first antenna are a first part and a second part of a first metal segment of a metal frame of the first body;
the two metal segments of the second antenna are a second metal segment and a third metal segment of a metal frame of the second body;
the first body includes:
a first circuit board;
a first feeding point for inputting signals to the first antenna and connected to a metal ground of the first circuit board based on a first radio frequency circuit; and
a first connector connected to the first feeding point and the first metal segment, a connection point between the first connector and the first metal segment being located at a center of the first metal segment, and the first part and the second part being integrally connected on two sides of the center of the first metal segment, respectively; and
the second body includes:
a second circuit board;
a second feeding point for inputting signals to the second antenna, and connected to a metal ground of the second circuit board based on a second radio frequency circuit; and
second connectors, the second metal segment being connected to the second feeding point through one of the second connectors, and the third metal segment being connected to the metal ground of the second circuit board through another one of the second connectors.

11. The electronic device according to claim 10, wherein the second body further includes a matching circuit configured to adjust at least one of a current intensity in the second metal segment or a current intensity in the second metal segment.

12. The electronic device according to claim 1, wherein the gap is a first gap;
the parts of the first antenna are a first part and a second part of a metal segment of a metal frame of the first body; and
a second gap is provided between the first part and the second part, and the first part and the second part are symmetrically arranged with respect to the second gap.

13. The electronic device according to claim 12, wherein:
the metal segment of the metal frame of the first body is a first metal segment;
the two metal segments of the second antenna are a second metal segment and a third metal segment of a metal frame of the second body;
the first body includes:
a first circuit board;
a first feeding point for inputting signals to the first antenna, and connected to a metal ground of the first circuit board based on a first radio frequency circuit; and
a first connector, one end of the first connector being connected to the first feeding point, and another end of the first connector being connected to the first part and the second part; and
the second body includes:
a second circuit board;
a second feeding point for inputting signals to the second antenna, and connected to a metal ground of the second circuit board based on a second radio frequency circuit; and
second connectors, the second metal segment being connected to the second feeding point through one of the second connectors, and the third metal segment being connected to the metal ground of the second circuit board through another one of the second connectors.

14. The electronic device according to claim 13, wherein the second body further includes a matching circuit configured to adjust at least one of a current intensity in the second metal segment or a current intensity in the second metal segment.

15. An electronic device comprising:
a first body including one or more antennas; and
a second body configured to be capable of flipping relative to the first body, and including one or more antennas;
wherein:
the one or more antennas of the first body and the one or more antennas of the second body are configured to at least form a plurality of target antennas with multiple inputs and multiple outputs, and the plurality of target antennas are configured to be capable of simultaneously being in a working state and have a same communication frequency band;
the plurality of target antennas include a first antenna that is one of the one or more antennas of the first body and a second antenna that is one of the one or more antennas of the second body;
the plurality of target antennas are configured such that:
when the first body and the second body are in a non-stacked position relationship, the plurality of target antennas are in the working state, and a distance between the first antenna and the second antenna meets an isolation requirement; and
when the first body and the second body are in a stacked position relationship, the plurality of target antennas are in the working state, and an antenna form of the first antenna and an antenna form of the second antenna meet the isolation requirement;
the first antenna includes a first metal segment of a metal frame of the first body, the first metal segment including a first part and a second part, and the second antenna includes a second metal segment and a third metal segment of a metal frame of the second body;
the first body includes:
a first circuit board;
a first feeding point for inputting signals to the first antenna and connected to a metal ground of the first circuit board based on a first radio frequency circuit; and a first connector connected to the first feeding point and the first metal segment, a connection point between the first connector and the first metal segment being located at a center of the first metal segment, and the first part and the second part being integrally connected on two sides of the center of the first metal segment, respectively; and the second body includes:

a second circuit board;

a second feeding point for inputting signals to the second antenna, and connected to a metal ground of the second circuit board based on a second radio frequency circuit; and second connectors, the second metal segment being connected to the second feeding point through one of the second connectors, and the third metal segment being connected to the metal ground of the second circuit board through another one of the second connectors.

16. An electronic device comprising:

a first body including one or more antennas; and a second body configured to be capable of flipping relative to the first body, and including one or more antennas;

wherein:

the one or more antennas of the first body and the one or more antennas of the second body are configured to at least form a plurality of target antennas with multiple inputs and multiple outputs, and the plurality of target antennas are configured to be capable of simultaneously being in a working state and have a same communication frequency band;

the plurality of target antennas include a first antenna that is one of the one or more antennas of the first body and a second antenna that is one of the one or more antennas of the second body;

the plurality of target antennas are configured such that:

when the first body and the second body are in a non-stacked position relationship, the plurality of target antennas are in the working state, and a distance between the first antenna and the second antenna meets an isolation requirement; and when the first body and the second body are in a stacked position relationship, the plurality of target antennas are in the working state, and an antenna form of the first antenna and an antenna form of the second antenna meet the isolation requirement;

the first antenna includes a metal segment of a metal frame of the first body, the metal segment includes a first part and a second part, a gap is provided between the first part and the second part, and the first part and the second part are symmetrically arranged with respect to the gap;

the metal segment of the metal frame of the first body is a first metal segment;

the second antenna includes a second metal segment and a third metal segment of a metal frame of the second body;

the first body includes:

a first circuit board;

a first feeding point for inputting signals to the first antenna, and connected to a metal ground of the first circuit board based on a first radio frequency circuit; and a first connector, one end of the first connector being connected to the first feeding point, and another end of the first connector being connected to the first part and the second part; and the second body includes:

a second circuit board;

a second feeding point for inputting signals to the second antenna, and connected to a metal ground of the second circuit board based on a second radio frequency circuit; and second connectors, the second metal segment being connected to the second feeding point through one of the second connectors, and the third metal segment being connected to the metal ground of the second circuit board through another one of the second connectors.

* * * * *